(12) United States Patent
Gong et al.

(10) Patent No.: US 10,767,692 B2
(45) Date of Patent: Sep. 8, 2020

(54) MAGNETIC LEVITATION BEARING ASSEMBLY AND COMPRESSOR

(71) Applicant: GREE GREEN REFRIGERATION TECHNOLOGY CENTER CO., LTD. OF ZHUHAI, Zhuhai (CN)

(72) Inventors: Gao Gong, Zhuhai (CN); Yusheng Hu, Zhuhai (CN); Xiaobo Zhang, Zhuhai (CN); Jianning Liu, Zhuhai (CN); Fang Zhang, Zhuhai (CN); Siyuan Tian, Zhuhai (CN); Jinxin Jia, Zhuhai (CN); Changguang Guo, Zhuhai (CN); Guanghai Li, Zhuhai (CN); Qiong Wei, Zhuhai (CN)

(73) Assignee: GREE GREEN REFRIGERATION TECHNOLOGY CENTER CO., LTD. OF ZHUHAI, Zhuhai (CN)

(*) Notice: Subject to any disclaimer, the term of this patent is extended or adjusted under 35 U.S.C. 154(b) by 24 days.

(21) Appl. No.: 16/077,618

(22) PCT Filed: Jan. 22, 2017

(86) PCT No.: PCT/CN2017/072033
§ 371 (c)(1),
(2) Date: Aug. 13, 2018

(87) PCT Pub. No.: WO2017/166911
PCT Pub. Date: Oct. 5, 2017

(65) Prior Publication Data
US 2019/0085902 A1    Mar. 21, 2019

(30) Foreign Application Priority Data
Mar. 31, 2016    (CN) .......................... 2016 1 0196615

(51) Int. Cl.
*F16C 32/04*    (2006.01)
*F04D 29/058*    (2006.01)

(52) U.S. Cl.
CPC .......... *F16C 32/048* (2013.01); *F04D 29/058* (2013.01); *F16C 32/0417* (2013.01);
(Continued)

(58) Field of Classification Search
CPC .............. F16C 32/0406; F16C 32/0421; F16C 32/0414; F16C 32/047; F16C 32/0474;
(Continued)

(56) References Cited

U.S. PATENT DOCUMENTS 4,180,946 A * 1/1980 Heijkenskjold .......... B23Q 5/10
310/90.5
5,021,697 A * 6/1991 Kralick ................... F16C 17/02
310/90
(Continued)

FOREIGN PATENT DOCUMENTS

CN    202451603 U    9/2012
CN    104454989 A    3/2015
(Continued)

OTHER PUBLICATIONS

International Search Report dated Apr. 24, 2018 in PCT/CN2017/072033, 2 pages.
(Continued)

*Primary Examiner* — Tulsidas C Patel
*Assistant Examiner* — Ahmed Elnakib
(74) *Attorney, Agent, or Firm* — Oblon, McClelland, Maier & Neustadt, L.L.P.

(57) ABSTRACT

A magnetic levitation bearing assembly, including: a magnetic levitation bearing, a shell, and a working clearance adjusting device; the magnetic levitation bearing includes a first iron core, a second iron core and a thrust disk; the
(Continued)

working clearance adjusting device is arranged between a radial inner periphery of the shell and the thrust disk along the radial direction, and between the shell and the second iron core along the axial direction; an axial end of the working clearance adjusting device is abutted against the second iron core, a void gap is provided between the shell and the second iron core, an adjustment on the magnetic levitation bearing working clearance is made possible by altering the length between two axial ends of the working clearance adjusting device, such that the working clearance is consistent with a design value.

8 Claims, 8 Drawing Sheets

(52) U.S. Cl.
CPC ...... *F16C 32/0427* (2013.01); *F16C 32/0476* (2013.01); *F16C 2360/44* (2013.01)

(58) Field of Classification Search
CPC ............... F16C 32/0431; F16C 32/044; F16C 32/0459; F16C 32/0461; F16C 32/0465; F16C 32/048; F16C 32/0482; F16C 29/058; F16C 2360/44
USPC ........................................................ 310/90.5
See application file for complete search history.

(56) References Cited

U.S. PATENT DOCUMENTS

| | | | | | |
|---|---|---|---|---|---|
| 5,622,040 | A | * | 4/1997 | Preutenborbeck | ....... D01H 4/12 192/105 CD |
| 5,679,992 | A | * | 10/1997 | Miyamoto | ............ F04D 19/048 310/90.5 |
| 6,121,704 | A | * | 9/2000 | Fukuyama | .......... F16C 32/0459 310/90.5 |
| 2009/0265038 | A1 | * | 10/2009 | Ramsey | ................ F16C 37/005 700/279 |
| 2016/0298680 | A1 | * | 10/2016 | Huang | .................... F16C 17/08 |
| 2019/0048930 | A1 | * | 2/2019 | Zhang | .................. F16C 32/0476 |
| 2019/0085902 | A1 | * | 3/2019 | Gong | .................... F04D 29/058 |

FOREIGN PATENT DOCUMENTS

| | | | |
|---|---|---|---|
| CN | 105650117 | A | 6/2016 |
| CN | 205446400 | U | 8/2016 |
| JP | 9-196064 | A | 7/1997 |
| TW | 201317468 | * | 5/2013 |
| TW | 201317468 | A1 | 5/2013 |

OTHER PUBLICATIONS

Extended European Search Report dated Aug. 7, 2019 in Patent Application No. 17772942.3, 8 pages.

\* cited by examiner

MAGNETIC LEVITATION BEARING ASSEMBLY AND COMPRESSOR

The present application claims the priority of Chinese Application No. 201610196615.5, filed in the Chinese Patent Office on Mar. 31, 2016, and entitled "MAGNETIC LEVITATION BEARING ASSEMBLY AND COMPRESSOR", whose entire contents are herein incorporated by reference.

TECHNICAL FIELD

The present disclosure relates to the technical field of magnetic levitation bearings, and more particularly to a magnetic levitation bearing assembly and a compressor.

BACKGROUND ART

With advantages such as small mechanical wear, low noise, low energy consumption and the like, a magnetic levitation bearing is widely used in ultra-high speed mechanical equipment.

Figure 1:
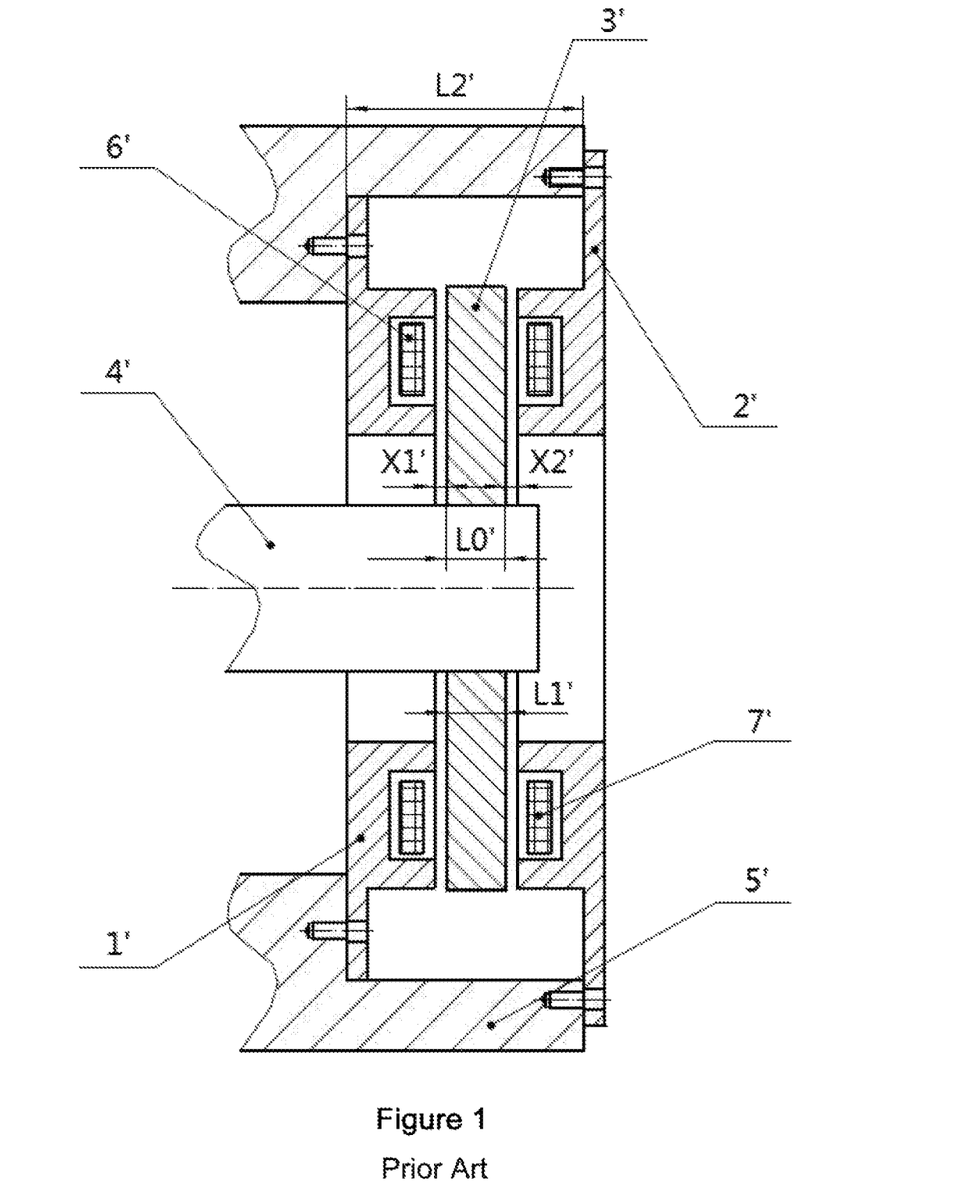
FIG. 1 shows a structural schematic diagram of a magnetic levitation bearing assembly in the prior art.

FIG. 1 shows a structural schematic diagram of a magnetic levitation bearing assembly comprising a magnetic levitation bearing and a shell in the prior art. As shown in FIG. 1, in the prior art, the magnetic levitation bearing assembly comprises a magnetic levitation bearing and a shell 5', wherein the magnetic levitation bearing comprises a first iron core 1', a second iron core 2', a thrust disc 3', a rotating shaft 4', a first coil 6' and a second coil 7', the thrust disc 3' is fixed to the rotating shaft 4', the first iron core 1' and the second iron core 2' are disposed at the two sides of the thrust disc 3' along the axial direction of the thrust disc 3', the first iron core 1' is provided with a first coil accommodating portion for mounting the first coil 6' and a first mounting portion for connecting the shell 5', the second iron core 2' is provided with a second coil accommodating portion for mounting the second coil 7' and a second mounting portion for connecting the shell 5', and in the axial direction of the thrust disc 3', the first mounting portion and the second mounting portion are both fit to the shell 5'. The spacing between an end of the first mounting portion away from the thrust disc 3' and another end of the second mounting portion away from the thrust disc 3'(an assembly size matched with the shell 5') is L2', the spacing between the first coil accommodating portion and the thrust disc 3'(a first working clearance) is X1', the spacing between the second coil accommodating portion and the thrust disc 3'(a second working clearance) is X2', and the axial length of the thrust disc 3' is L0', therefore, if a sum of the first working clearance X1' and the second working clearance X2' is defined as the working clearance of the magnetic levitation bearing, the working clearance of the magnetic levitation bearing is equal to X1'+X2'.

The bearing capacity of the magnetic levitation bearing mainly depends on the working clearance, and when the working clearance of the magnetic levitation bearing deviates, the bearing capacity of the magnetic levitation bearing cannot meet the load requirements, and it may even cause problems such as magnetic levitation failure and product becoming useless and the like. As can be seen, whether the actual working clearance and the preset value of the magnetic levitation bearing are consistent is a key indicator for evaluating whether the bearing capacity of the magnetic levitation bearing meets the design requirements. However, since the machining and assembly errors are difficult to avoid, the actual working clearance often deviates from the preset value of the magnetic levitation bearing. In this case, the working clearance of the magnetic levitation bearing needs to be adjusted.

Based on the existing magnetic levitation bearing assembly structure, the working clearance is mainly adjusted by turning or grinding the end of the iron core, which is specifically as follows:

(1) When the working clearance is greater than the preset value and the deviation thereof is $\Delta L$, an end of the second mounting portion close to the thrust disc 3'(namely the left end of the second mounting portion corresponding to the assembly size L2' in FIG. 1) is turned to the right by $\Delta L$, so that a spacing $\Delta L$ is generated in the axial direction between the second mounting portion and the shell 5', then the second iron core 2' is moved to the left by $\Delta L$ to fit the second mounting portion with the shell 5' again, so that the working clearance is reduced by $\Delta L$, in this way, the working clearance is adjusted to conform to the preset value, and the purpose of adjusting the working clearance is achieved.

(2) When the working clearance is smaller than the preset value and the deviation thereof is $\Delta L$, an end of the first coil accommodating portion close to the thrust disc 3' (a right end of the first coil accommodating portion corresponding to the working clearance in FIG. 1) is turned to the left by $\Delta L$, or an end of the second coil accommodating portion close to the thrust disc 3' (a left end of the second coil accommodating portion corresponding to the working clearance in FIG. 1) is turned to the right by $\Delta L$, then the working clearance is increased by $\Delta L$, in this way, the working clearance is adjusted to conform to the preset value, and the purpose of adjusting the working clearance is achieved.

The above-mentioned method of turning or grinding the end of the iron core can adjust the working clearance, but it requires secondary processing of the iron core by turning or grinding, therefore, the processing cost is high, the adjustment difficulty is large, and the form and location tolerance of the secondary processing is difficult to guarantee, and it is liable to cause the working position of the iron core to be inaccurate. In addition, during the turning or grinding of the end of the iron core, the first coil 6' and the second coil 7' are prone to be damaged to affect the normal work of the magnetic levitation bearing, which results in electrical safety hazards, and may even directly cause the first coil 6' or the second coil 7' to become useless, increasing the production cost.

CONTENT OF THE INVENTION

One technical problem to be solved by the present disclosure is to realize the adjustment of the working clearance of a magnetic levitation bearing under the premise of avoiding processing errors and coil damage risks caused by secondary processing.

According to a first aspect of the present disclosure, the present disclosure provides a magnetic levitation bearing assembly, comprising a magnetic levitation bearing, a shell and a working clearance adjusting device, wherein the magnetic levitation bearing comprises a first iron core, a second iron core and a thrust disc, the thrust disc is located between the first iron core and the second iron core along the axial direction of the thrust disc, a first working clearance exists between the first iron core and the thrust disc, a second working clearance exists between the second iron core and the thrust disc, the first iron core and the second iron core are both fixedly connected with the shell, the working clearance adjusting device is disposed between a radial inner periphery of the shell and the thrust disc along the radial direction of the thrust disc and is disposed between the shell and the second iron core along the axial direction of the thrust disc, an axial end of the working clearance adjusting device abuts against the second iron core, a void gap exists between the shell and the second iron core, and the working clearance adjusting device is configured to adjust the sum of the first working clearance and the second working clearance to conform to a preset value.

Optionally, the working clearance adjusting device is disposed between the first iron core and the second iron core along the axial direction of the thrust disc, and the other axial end of the working clearance adjusting device abuts against the first iron core.

Optionally, the magnetic levitation bearing further comprises a first coil and a second coil, wherein the first iron core is provided with a first coil accommodating portion for mounting the first coil and a first mounting portion for connecting the shell, the second iron core is provided with a second coil accommodating portion for mounting the second coil and a second mounting portion for connecting the shell, and the working clearance adjusting device is disposed between the first mounting portion and the second mounting portion along the axial direction of the thrust disc, two axial ends of the working clearance adjusting device respectively abutting against the first mounting portion and the second mounting portion.

Optionally, the radial size of the second mounting portion is greater than that of the first mounting portion, and the shell is provided with a step-shaped matching portion for matching with the first mounting portion and the second mounting portion, the step-shaped matching portion being provided with a first mounting segment and a second mounting segment with a diameter greater than that of the first mounting segment and connected with the first mounting segment through a stepped surface, wherein the stepped surface is fitted with an end of the first mounting portion away from the thrust disc, and the void gap exists between an end of the second mounting segment away from the first mounting segment and another end of the second mounting portion close to the thrust disc.

Optionally, an end of the first mounting portion close to the thrust disc is farther from the thrust disc relative to an end of the first coil accommodating portion close to the thrust disc, and the end of the second mounting portion close to the thrust disc is farther from the thrust disc relative to an end of the second coil accommodating portion close to of the thrust disc.

Optionally, the other axial end of the working clearance adjusting device abuts against the shell.

Optionally, the working clearance adjusting device comprises a plurality of working clearance adjusting members, and the lengths between the two axial ends of the plurality of working clearance adjusting members are all different, so that different deviations of the sum of the first working clearance and the second working clearance from the preset value is adjusted by disposing different working clearance adjusting members between the shell and the second iron core.

Optionally, the working clearance adjusting member is a working clearance adjusting ring.

Optionally, a radial outer periphery of the working clearance adjusting ring abuts against the radial inner periphery of the shell.

Optionally, the length between the two axial ends of the working clearance adjusting device is adjustable to conform the sum of the first working clearance and the second working clearance to the preset value.

Optionally, the working clearance adjusting device comprises a first adjusting ring, a second adjusting ring and a locking member, one end of the first adjusting ring is provide with first threads, one end of the second adjusting ring is provided with second threads, the second threads are matched with the first threads to connect the first adjusting ring with the second adjusting ring, the length between the two axial ends of the working clearance adjusting device is adjustable through the relative rotation of the first adjusting ring and the second adjusting ring, so that the sum of the first working clearance and the second working clearance conforms to the preset value, and the locking member is configured to lock a position of the first threads relative to the second threads.

According to a second aspect of the invention, the present disclosure further provides a compressor, including the magnetic levitation bearing assembly of the present disclosure.

The magnetic levitation bearing assembly provided by the present disclosure comprises the working clearance adjusting device disposed between the shell and the second iron core along the axial direction of the thrust disc, the axial end of the working clearance adjusting device abuts against the second iron core, and the void gap is provided between the shell and the second iron core, therefore in the present disclosure, the distance between the first iron core and the second iron core can be adjusted by changing the length between the two axial ends of the working clearance adjusting device, so that the sum of the first working clearance and the second working clearance can be adjusted to conform to the preset value, in this way, it can be ensured that the bearing capacity of the magnetic levitation meets the design requirements. Since no secondary processing needs to be performed on the magnetic levitation bearing, the present disclosure can avoid a series of problems caused by secondary machining errors, and since there is no need to turn or grind the end of the iron cores, no damage is generated to the coils. As can be seen, the present disclosure can conveniently realize the adjustment of the working clearance of the magnetic levitation bearing under the premise of effectively avoiding processing errors and coil damage risks caused by the secondary processing of the magnetic levitation bearing.

Other features of the present disclosure and advantages thereof will become apparent from the following detailed description of exemplary embodiments of the present disclosure with reference to the drawings.

BRIEF DESCRIPTION OF THE DRAWINGS

To illustrate technical solutions in the embodiments of the present disclosure or in the prior art more clearly, a brief introduction on the drawings which are needed in the description of the embodiments or the prior art is given below. Apparently, the drawings in the description below are merely some of the embodiments of the present disclosure, based on which other drawings can be obtained by those of ordinary skill in the art without any creative effort.

REFERENCE SIGNS

1', first iron core; 2', second iron core; 3', thrust disc; 4', rotating shaft; 5', shell; 6', first coil; 7', second coil;

1, first iron core; 2, second iron core; 3, thrust disc; 4, rotating shaft; 5, shell; 6, first coil; 7, second coil; 8, working clearance adjusting ring; 81, first adjusting ring; 811, first threads; 82, second adjusting ring; 821, second threads; 83, locking member.

EMBODIMENTS

In conjunction with the drawings in the embodiments of the present disclosure, a clear and complete description of technical solutions in the embodiments of the present disclosure will be given below. Apparently, the embodiments described below are merely a part, but not all, of the embodiments of the present disclosure. The following description of at least one exemplary embodiment is merely illustrative in nature and it should not be construed as any limitation to the present disclosure and its application or use. All of other embodiments, obtained by those of ordinary skill in the art, based on the embodiments of the present disclosure without any creative effort, fall into the protection scope of the present disclosure.

Techniques, methods and devices known to those of ordinary skill in the relevant art may be not discussed in detail, but the techniques, methods and devices should be considered as part of the specification of the granted patent where appropriate.

In the description of the present disclosure, it should be understood that orientation or positional relationships indicated by orientation words such as "front, back, up, down, left, right", "transverse, vertical, perpendicular, horizontal", and "top, bottom" and the like are usually orientation or positional relationships shown in the drawings, and are merely for the convenience of describing the present disclosure and simplifying the description, these orientation words do not indicate or imply the indicated device or element must have a specific orientation or be constructed or operated in a specific orientation in the absence of the contrary description, and thus cannot be interpreted as limitation to the protection scope of the present disclosure; and the orientation words "inside and outside" refer to the inside and outside relative to the contours of the components themselves.

In the description of the present disclosure, it should understood that "first", "second" and other words are used for limiting the parts and components only for the purpose of conveniently distinguishing the corresponding parts and components, and the above words have no special meaning if not stated otherwise, so the words cannot be understood as limitation to the protection scope of the present disclosure.

Figure 2:
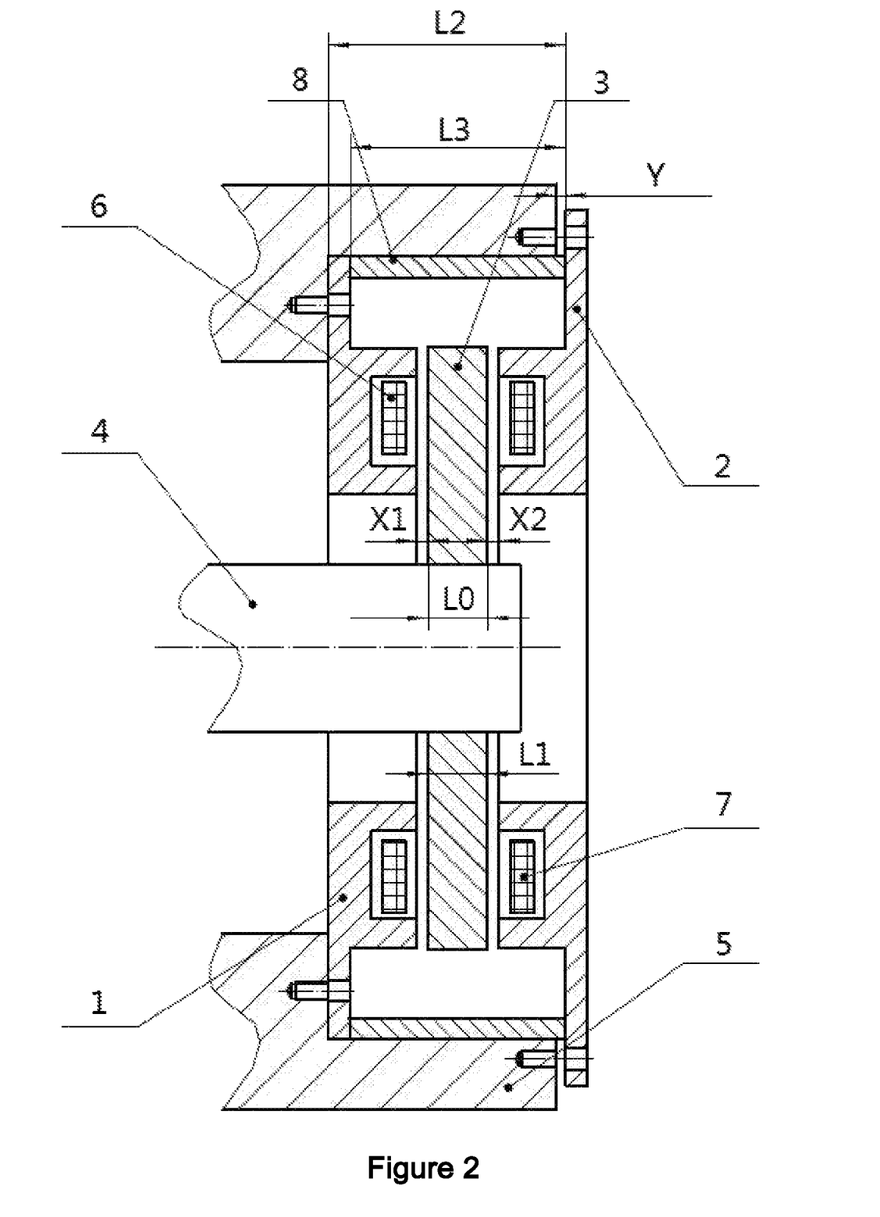
FIG. 2 shows a structural schematic diagram of a magnetic levitation bearing assembly in an embodiment of the present disclosure.

FIG. 2 shows a structural schematic diagram of a magnetic levitation bearing assembly in an embodiment of the present disclosure. With reference to FIG. 2, the magnetic levitation bearing assembly provided by the present disclosure comprises a magnetic levitation bearing, a shell 5 and a working clearance adjusting device, wherein the magnetic levitation bearing comprises a first iron core 1, a second iron core 2 and a thrust disc 3, the thrust disc 3 is disposed between the first iron core 1 and the second iron core 2 along the axial direction of the thrust disc 3, a first working clearance X1 exists between the first iron core 1 and the thrust disc 3, a second working clearance X2 exists between the second iron core 2 and the thrust disc 3, the first iron core 1 and the second iron core 2 are both fixedly connected with the shell 5, the working clearance adjusting device is disposed between a radial inner periphery of the shell 5 and the thrust disc 3 along the radial direction of the thrust disc 3 and is disposed between the shell 5 and the second iron core 2 along the axial direction of the thrust disc 3, an axial end of the working clearance adjusting device abuts against the second iron core 2, a void gap Y is provided between the shell 5 and the second iron core 2, and the working clearance adjusting device is configured to adjust the sum of the first working clearance X1 and the second working clearance X2 to conform to a preset value.

In the present disclosure, the working clearance adjusting device with one axial end abutting against the second iron core 2 is disposed between the shell 5 and the second iron core 2 of the magnetic levitation bearing assembly, and the void gap Y is provided between the shell 5 and the second iron core 2, so that the sum of the first working clearance X1 and the second working clearance X2 (for the convenience of description, it is referred to as the working clearance below) can be adjusted through the length between the two axial ends of the working clearance adjusting device in the present disclosure, so as to guarantee that the working clearance conforms to the preset value (the expression "conforms to" herein refers to that the working clearance is equal to the preset value or the deviation there between is within an allowable error range), thereby ensuring that the bearing capacity of the magnetic levitation bearing meets the design requirements. Since no secondary processing needs to be performed on the magnetic levitation bearing, the present disclosure can avoid a series of problems caused by secondary machining errors, and since there is no need to turn or grind the end of the first iron core 1 or the end of the second iron core 2, no damage is generated to the first coil 6 or the second coil 7. Therefore, the present disclosure can conveniently realize the adjustment of the working clearance of the magnetic levitation bearing under the premise of effectively avoiding processing errors and coil damage risks caused by the secondary processing of the magnetic levitation bearing.

The working clearance adjusting device of the present disclosure is disposed between the shell 5 and the second iron core 2 along the axial direction of the thrust disc 3, specifically, the working clearance adjusting device may be directly disposed between the shell 5 and the second iron core 2 along the axial direction of the thrust disc 3, that is, the two axial ends of the working clearance adjusting device respectively abut against the shell 5 and the second iron core 2; or the working clearance adjusting device may also be indirectly disposed between the shell 5 and the second iron core 2 along the axial direction of the thrust disc 3, for example, the two axial ends of the working clearance adjusting device respectively abut against the first iron core 1 and the second iron core 2.

Figure 3:
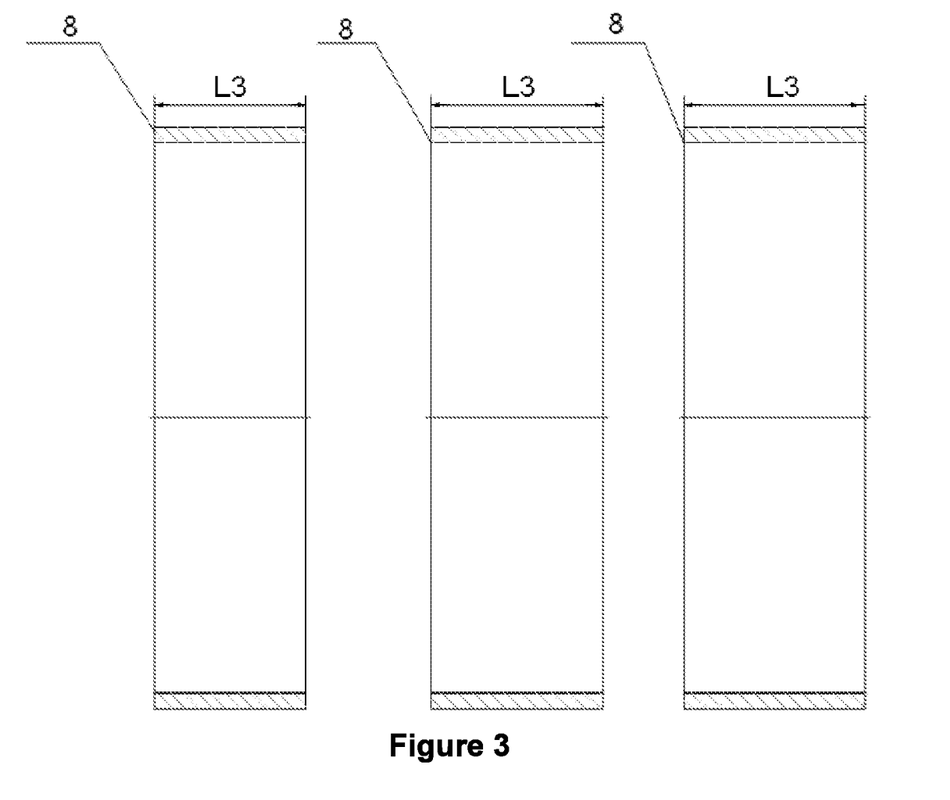
FIG. 3 shows a structural schematic diagram of a working clearance adjusting device in an embodiment of the present disclosure.

Referring to FIG. 3, a first implementation of the working clearance adjusting device, the working clearance adjusting device may comprise a plurality of working clearance adjusting members, and the lengths between the two axial ends of the plurality of working clearance adjusting members are all different, so that different deviations of the sum of the working clearance from the preset value can be adjusted by disposing different working clearance adjusting members between the shell 5 and the second iron core 2.

As a second implementation of the working clearance adjusting device, the length between the two axial ends of the working clearance adjusting device is adjustable to conform the working clearance to the preset value. The difference from the first implementation lies in that, in the second implementation, the working clearance adjusting device is configured to change the length between the two axial ends by itself, in this way, during adjustment of the working clearance, there is no need to change different working clearance adjusting members, but only to adjust the axial length of the working clearance adjusting device itself, so that the working clearance can be adjusted more conveniently and quickly.

Figure 4:
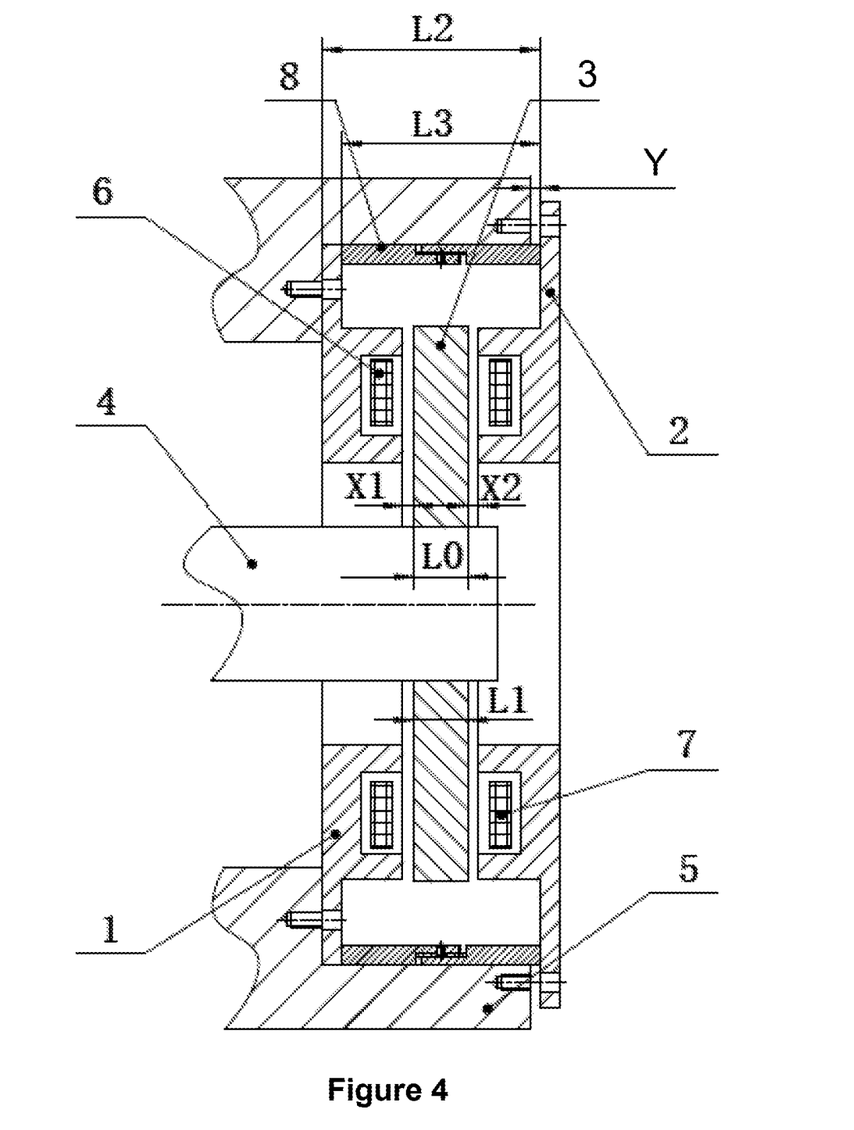
FIG. 4 shows a structural schematic diagram of a magnetic levitation bearing assembly in another embodiment of the present disclosure.
Figure 5:
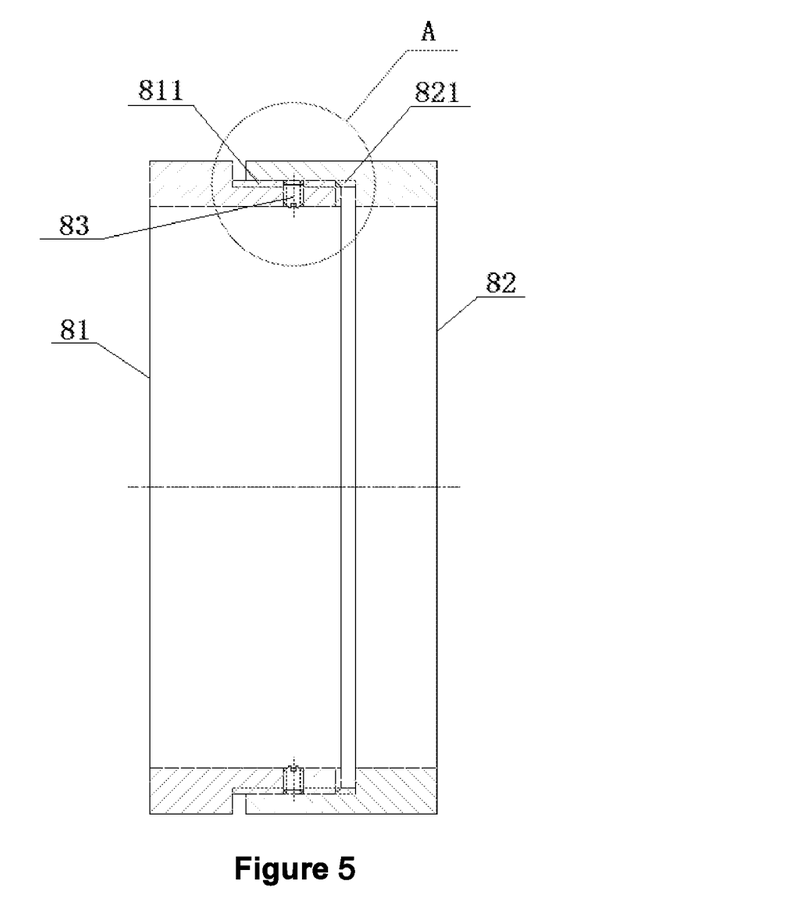
FIG. 5 shows a structural schematic diagram of the working clearance adjusting device in FIG. 4.
Figure 6:
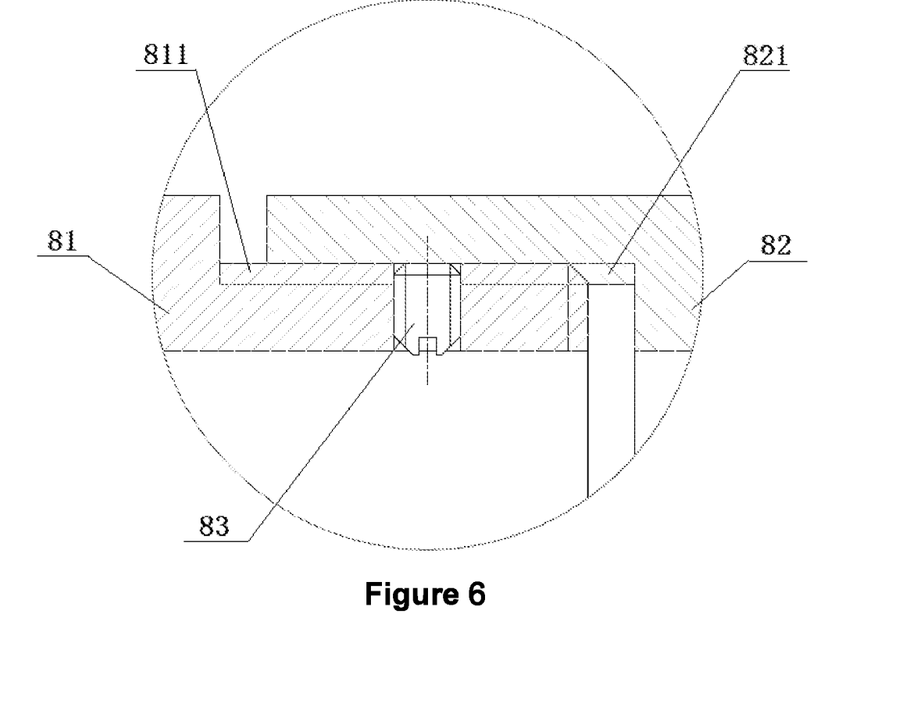
FIG. 6 shows a partial enlargement diagram of FIG. 5 at A.
Figure 7:
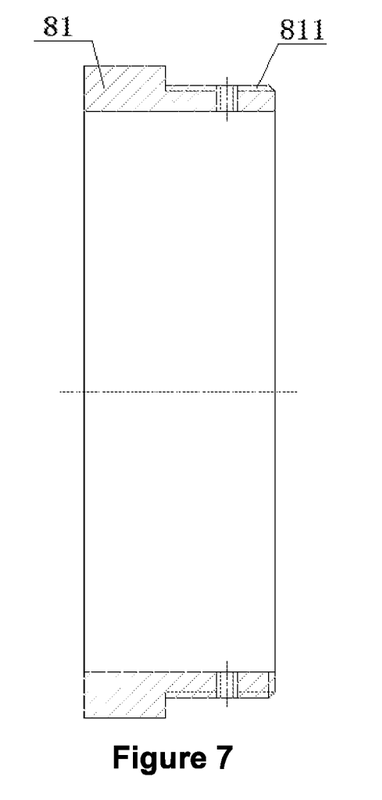
FIG. 7 shows a structural schematic diagram of a first adjusting ring in FIG. 5.
Figure 8:
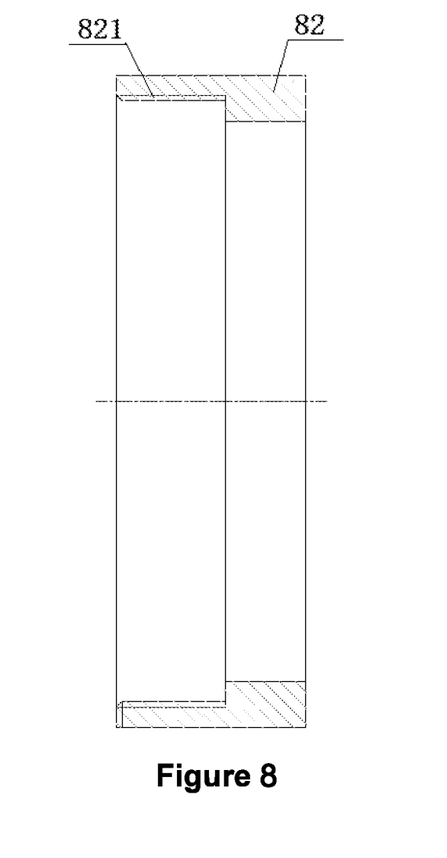
FIG. 8 shows a structural schematic diagram of a second adjusting ring in FIG. 5.

Referring to FIG. 4, as an embodiment of the working clearance adjusting device in the second implementation, the working clearance adjusting device may comprise a first adjusting ring 81, a second adjusting ring 82 and a locking member 83, one end of the first adjusting ring 81 is provide with first threads 811, one end of the second adjusting ring 82 is provided with second threads 821, the second threads 821 are matched with the first threads 811 to connect the first adjusting ring 81 with the second adjusting ring 82, the axial length of the working clearance adjusting device is adjustable through the relative rotation of the first adjusting ring 81 and the second adjusting ring 82, so that the working clearance conforms to the preset value, and the locking member 83 is configured to lock relative positions of the first threads 811 and the second threads 821. The locking member 83, for example, can be a locking pin or a locking screw. After the working clearance adjusting device is adjusted to a proper axial length, locking holes, which are unthreaded holes for the locking pin or threaded holes for the locking screw, may be punched in the first adjusting ring and the second locking ring along the radial direction (or the axial direction) at the same time, and then the position of the first adjusting ring relative to the second adjusting ring is locked by inserting the locking pin or the locking screw into the locking holes.

As the first adjusting ring is in threaded connection with the second adjusting ring, the axial length of the working clearance adjusting device itself can be conveniently adjusted through the relative rotation of the first adjusting ring and the second adjusting ring. Moreover, as the locking member is provided, after the axial length of the working clearance adjusting device is adjusted to the required value, the relative position of the first adjusting ring and the second adjusting ring can be locked through the locking member, so that wrong adjustment of the length between the two axial ends of the working clearance adjusting ring is not likely to occur, thus ensuring the adjustment accuracy of the working clearance, and the locked working clearance adjusting device can also more stably support and position the first mounting portion or the second mounting portion.

The above first implementation will be further illustrated in combination with the embodiment shown in FIG. 2.

As shown in FIG. 2, in the embodiment, the magnetic levitation bearing assembly comprises the magnetic levitation bearing, the shell 5 and the working clearance adjusting device, wherein the working clearance adjusting device is disposed between the first iron core 1 and second iron core 2, and the working clearance adjusting device comprises a plurality of working clearance adjusting rings 8 serving as the working clearance adjusting members.

The magnetic levitation bearing comprises the first iron core 1, the second iron core 2, the first coil 6, the second coil 7 and the thrust disc 3. The thrust disc 3 is fixed to the rotating shaft 4 and is capable of rotating with the rotating shaft 4, that is, the thrust disc 3 serves as a rotor of the magnetic levitation bearing; the first coil 6 is disposed on the first iron core 1, the second coil 7 is disposed on the second iron core 2, the first iron core 1 and the second iron core 2 are arranged on two sides of the thrust disc 3 along the axial direction of the thrust disc 3, the first working clearance X1 is provided between the first iron core 1 and the thrust disc 3, the second working clearance X2 is provided between the second iron core 2 and the thrust disc 3, and the first iron core 1 and the second iron core 2 are both fixedly connected with the shell 5, so that the first iron core 1, the first coil 6, the second iron core 2 and the second coil 7 jointly serve as a stator of the magnetic levitation bearing. In this way, when the thrust disc 3 rotates under the drive of the rotating shaft 4 and current is injected into the first coil 6 and the second coil 7, a magnetic field is generated between the stator and the rotor of the magnetic levitation bearing, and the magnetic force of the magnetic field enables the rotor to levitate in the air.

Specifically, in the embodiment, the first iron core 1 is provided with a first coil accommodating portion and a first mounting portion, the second iron core 2 is provided with a second coil accommodating portion and a second mounting portion, wherein the first coil accommodating portion is for mounting the first coil 6, the second coil accommodating portion is for mounting the second coil 7, and the first coil accommodating portion provided with the first coil 6 and the second coil accommodating portion provided with the second coil 7 cooperate with the thrust disc 3 to form a magnetic field, while the first mounting portion and the second mounting portion are respectively for connecting the shell 5 to fix the first iron core 1 and the second iron core 2. The first mounting portion and the second mounting portion may be fixedly connected with the shell 5 through screws or bolts or other fasteners. The first working clearance X1 is formed between the first coil accommodating portion and the thrust disc 3, the second working clearance X2 is formed between the second coil accommodating portion and the thrust disc 3, and the axial length of the thrust disc 3 is L0, then the spacing between the first coil accommodating portion and the second coil accommodating portion is L1=X1+L0+X2, and the working clearance (the sum of the first working clearance X1 and the second working clearance X2) is equal to X1+X2.

The working clearance adjusting ring 8 is disposed between a radial inner periphery of the shell 5 and the thrust disc 3 along the radial direction of the thrust disc 3, meanwhile, the working clearance adjusting ring 8 is disposed between the first iron core 1 and the second iron core 2 along the axial direction of the thrust disc 3, and the two axial ends of the working clearance adjusting ring 8 respectively abut against the first mounting portion and the second mounting portion, that is, the length between the two axial ends of the working clearance adjusting ring 8 (the axial length for short below) is equal to the spacing L3 between the first mounting portion and the second mounting portion. In this way, when the working clearance adjusting rings 8 with different axial lengths are disposed between the first mounting portion and the second mounting portion, the spacing L3 between the first mounting portion and the second mounting portion changes.

In order to conveniently change the spacing L3 between the first mounting portion and the second mounting portion, as illustrated in FIG. 2, in the embodiment, a void gap Y is provided between the second mounting portion and the shell 5, while the first mounting portion is fitted with the shell 5 along the axial direction of the thrust disc 3. In this way, when the spacing L3 between the first mounting portion and the second mounting portion changes due to the change of the axial length of the working clearance adjusting ring 8, the void gap Y changes as well, so that the working clearance of the magnetic levitation bearing can be conveniently adjusted to keep in conformity with the preset value.

Specifically, as shown in FIG. 2, in the embodiment, the radial size of the second mounting portion is greater than that of the first mounting portion, and the shell 5 is provided with a step-shaped matching portion for matching with the first mounting portion and the second mounting portion. The step-shaped matching portion is provided with a first mounting segment and a second mounting segment, and the second mounting segment which is with a diameter greater than that of the first mounting segment is connected with the first mounting segment through a stepped surface. The stepped surface is fitted with an end of the first mounting portion away from the thrust disc 3 (the left end of the first mounting portion), and the void gap Y is provided between an end of the second mounting segment away from the first mounting segment and an end of the second mounting portion close to one side of the thrust disc 3 (the right end of the second mounting portion). In this way, the axial spacing between the end of the first mounting portion away from the thrust disc 3 (the left end of the first mounting portion) and the end of the second mounting portion close to the thrust disc 3 (the right end of the second mounting portion) is L2, and the difference between L2 and L3 is the thickness of the first mounting portion along the axial direction of the thrust disc 3. Based on this setting, a space can be reserved for the working clearance adjusting ring 8 to adjust the working clearance, so that the working clearance can be conveniently adjusted by selecting different working clearance adjusting rings 8 with different axial lengths, and the fixing firmness of the stator and the compactness of the magnetic levitation bearing assembly can also be guaranteed.

Further, in order to make working clearance adjusting ring 8 be disposed between the radial inner periphery of the shell 5 and the thrust disc 3 along the radial direction of the thrust disc 3 more stably, as shown in FIG. 2, in the embodiment, a radial outer periphery of the working clearance adjusting ring 8 abuts against the radial inner periphery of the shell 5, so that the radial displacement of the working clearance adjusting ring 8 is limited by the shell 5, and accordingly, the working clearance adjusting ring 8 can be disposed more stably between the radial inner periphery of the shell 5 and the thrust disc 3 without moving up and down in the radial direction. Moreover, as the two axial ends of the working clearance adjusting ring 8 respectively abut against the first mounting portion and the second mounting portion, the axial displacement of the working clearance adjusting ring 8 is limited by the first mounting portion and the second mounting portion. In this case, the axial displacement and the radial displacement of the working clearance adjusting ring 8 are both limited in the embodiment, so that the working clearance adjusting ring 8 can be well located. Meanwhile, as the locating is achieved by abutting, during adjustment of the working clearance by changing the working clearance adjusting ring 8, no redundant fixing member needs to be dismounted, in this way, the embodiment can facilitate disassembly and assembly, thereby the working clearance can be adjusted in a more time-saving and labor-saving manner, improving the adjusting efficiency of the working clearance.

In addition, as shown in FIG. 2, in the embodiment, an end of the first mounting portion close to the thrust disc 3 (the right end of the first mounting portion in FIG. 2) is farther from the thrust disc 3 relative to an end of the first coil accommodating portion close to the thrust disc 3 (the right end of the first coil accommodating portion in FIG. 2), and an end of the second mounting portion close to the thrust disc 3 (the left end of the second mounting portion in FIG. 2) is farther from the thrust disc 3 relative to an end of the second coil accommodating portion close to the thrust disc 3 (the left end of the second coil accommodating portion in FIG. 2), in this way, the spacing L3 between the first mounting portion and the second mounting portion is greater than the spacing L1 between the first coil accommodating portion and the second coil accommodating portion, and thus the working clearance adjusting ring 8 can be conveniently disposed.

Since the working clearance adjusting device in the embodiment comprises a plurality of working clearance adjusting rings 8 with different axial lengths, when the working clearance is smaller than the preset value, the working clearance adjusting ring 8 with a greater axial length can be selected to increase the working clearance, and when the working clearance is greater than the preset value, the working clearance adjusting ring 8 with a smaller axial length can be selected to reduce the working clearance, so that the working clearance is adjusted to keep conforming to the preset value, ensuring that the bearing capacity of the magnetic levitation bearing meets the design requirements. As can be seen, when the working clearance is adjusted based on the magnetic levitation bearing assembly of the embodiment, the magnetic levitation bearing assembly needs to be disassembled and assembled, and the specific disassembly and assembly process is as follows:

(1) Assembling a stator assembly: firstly winding the first coil 6 and the second coil 7, then mounting the first coil 6 on the first coil accommodating portion, so that the first coil 6 forms a first stator assembly with the first iron core 1, and mounting the second coil 7 on the second coil accommodating portion, so that the second coil 7 forms a second stator assembly with the second iron core 2;

(2) Assembling a rotor assembly: mounting the thrust disc 3 on the rotating shaft 4 in a hot manner, forming the rotor assembly;

(3) Assembling the first stator assembly, the shell 5 and the rotor assembly: mounting the first stator assembly on the shell 5 through the first mounting portion of the first iron core 1, then assembling the rotor assembly, forming the first working clearance X1 between the left end of the thrust disc 3 and the right end of the first coil accommodating portion of the first iron core 1;

(4) Assembling the working clearance adjusting ring 8: abutting the left axial end of the working clearance adjusting ring 8 against the right end of the first mounting portion, and abutting a radial outer periphery of the working clearance adjusting ring 8 against the radial inner periphery of the shell 5;

(5) Assembling the second stator assembly: abutting the left end of the second mounting portion of the second iron core 2 against the right axial end of the working clearance adjusting ring 8, at this time, the void gap Y is formed between the left end of the second mounting portion and the shell 5, and the second working clearance X2 is formed between the left end of the second coil accommodating portion and the right end of the thrust disc 3, then the fixing the second mounting portion to the shell 5 through screws or bolts or other fasteners;

(6) Detecting (often with a displacement sensor) the sum of the first working clearance X1 and the second working clearance X2, and judging whether the sum of the first working clearance X1 and the second working clearance X2 conforms to the preset value, that is, judging whether the working clearance conforms to the preset value;

(7) When there is a deviation between the working clearance and the preset value, detaching the second stator assembly and the working clearance adjusting ring 8, then replacing the working clearance adjusting ring 8 with another one with a corresponding length, and repeating the steps (4) to (6) until the working clearance conforms to the preset value.

As can be seen, based on the magnetic levitation bearing assembly of the embodiment, the working clearance can be adjusted by selecting the working clearance adjusting rings 8 with different axial lengths to assemble into the magnetic levitation bearing, so that the bearing capacity of the magnetic levitation bearing is ensured to meet the design requirements, the form and location tolerance is easy to guarantee, and the adjustment accuracy is higher. Compared with the adjustment method of turning or grinding the end of the iron core in the prior art, as no secondary processing needs to be performed on the first iron core 1 or the second iron core 2 in the embodiment, the working clearance can be adjusted more conveniently in a labor-saving and time-saving manner, and as there is no form and position error caused by the secondary processing, the adjustment accuracy of the working clearance can be improved; in addition, as the first iron core 1 or the second iron core 2 does not need to be turned or ground, the damage to the first coil 6 or the second coil 7 can be effectively avoided, therefore electrical safety hazards can be prevented, and the normal work of the magnetic levitation bearing is guaranteed. Furthermore, the working clearance adjusting ring 8 in the embodiment is unlikely to damage in use and can be recycled, therefore the embodiment can effectively save resources and reduce the production cost.

In the magnetic levitation bearing assembly of the embodiment, as the void gap Y is provided between the second mounting portion and the shell 5, a space is reserved for the adjustment of the working clearance, and since the two axial ends of the working clearance adjusting ring 8 respectively abut against the first mounting portion and the second mounting portion, the working clearance adjusting ring 8 can always support and position the second iron core 2, in this way, although the void gap Y is provided, the second iron core 2 can still be fixed firmly, ensuring the assembly accuracy of the second iron core 2. As can be seen, in the embodiment, as the working clearance adjusting device is provided, and the void gap Y is provided between the shell 5 and the second iron core 2, the magnetic levitation bearing assembly can conveniently adjust the working clearance, and the assembly requirements of the magnetic levitation bearing also can be met.

The magnetic levitation bearing assembly of the present disclosure can be applied to a compressor and other products. By adoption of the magnetic levitation bearing assembly of the present disclosure, the requirements of the compressor and other products for the bearing capacity of the magnetic levitation bearing can be better met, and the working performance of the compressor and other products is improved.

Described above are merely exemplary embodiments of the present disclosure, which are not intended to limit the present disclosure. Any modifications, equivalent replacements and improvements made within the spirit and principle of the present disclosure shall be encompassed within the protection scope of the present disclosure.

The invention claimed is:
1. A magnetic levitation bearing assembly, comprising:
a magnetic levitation bearing, comprising a first iron core, a second iron core and a thrust disc, wherein the thrust disc is arranged between the first iron core and the second iron core along an axial direction of the thrust disc, a first working clearance exists between the first iron core and the thrust disc, and a second working clearance exists between the second iron core and the thrust disc;
a shell, the first iron core and the second iron core are both fixedly connected with the shell; and
a working clearance adjusting device, disposed between a radial inner periphery of the shell and the thrust disc along a radial direction of the thrust disc and between the shell and the second iron core along the axial direction of the thrust disc, wherein an axial end of the working clearance adjusting device abuts against the second iron core, a void gap exists between the shell and the second iron core, and the working clearance adjusting device is configured to adjust a sum of the first working clearance and the second working clearance to conform to a preset value,
wherein the working clearance adjusting device is disposed between the first iron core and the second iron core along the axial direction of the thrust disc, and the other axial end of the working clearance adjusting device abuts against the first iron core,
wherein the magnetic levitation bearing assembly further comprise a first coil and a second coil, wherein the first iron core is provided with a first coil accommodating portion for mounting the first coil and a first mounting portion for connecting the shell, the second iron core is provided with a second coil accommodating portion for mounting the second coil and a second mounting portion for connecting the shell, and the working clearance adjusting device is disposed between the first mounting portion and the second mounting portion along the axial direction of the thrust disc, two axial ends of the working clearance adjusting device respectively abutting against the first mounting portion and the second mounting portion, and
wherein a radial size of the second mounting portion is greater than that of the first mounting portion, and the shell is provided with a step-shaped matching portion for matching with the first mounting portion and the second mounting portion, the step-shaped matching portion being provided with a first mounting segment and a second mounting segment with a diameter greater than that of the first mounting segment and connected with the first mounting segment through a stepped surface, wherein the stepped surface is fitted with an end of the first mounting portion away from the thrust disc, and the void gap exists between an end of the second mounting segment away from the first mounting segment and another end of the second mounting portion close to the thrust disc.

2. The magnetic levitation bearing assembly according to claim 1, wherein an end of the first mounting portion close to the thrust disc is farther from the thrust disc relative to an end of the first coil accommodating portion close to the thrust disc, and an end of the second mounting portion close to the thrust disc is farther from the thrust disc relative to an end of the second coil accommodating portion close to of the thrust disc.

3. The magnetic levitation bearing assembly according to claim 1, wherein the working clearance adjusting device comprises a plurality of working clearance adjusting members, and lengths between the two axial ends of each of the plurality of working clearance adjusting members are all different, so that different deviations of the sum of the first working clearance and the second working clearance from the preset value is adjusted by disposing different working clearance adjusting members between the shell and the second iron core.

4. The magnetic levitation bearing assembly according to claim 3, wherein the working clearance adjusting member is a working clearance adjusting ring.

5. The magnetic levitation bearing assembly according to claim 4, wherein a radial outer periphery of the working clearance adjusting ring abuts against the radial inner periphery of the shell.

6. The magnetic levitation bearing assembly according to claim 1, wherein a length between the two axial ends of the working clearance adjusting device is adjustable to conform the sum of the first working clearance and the second working clearance to the preset value.

7. The magnetic levitation bearing assembly according to claim 6, wherein the working clearance adjusting device comprises a first adjusting ring, a second adjusting ring and a locking member, one end of the first adjusting ring is provide with first threads, one end of the second adjusting ring is provided with second threads, the second threads are matched with the first threads to connect the first adjusting ring with the second adjusting ring, the length between the two axial ends of the working clearance adjusting device is adjustable through relative rotation of the first adjusting ring and the second adjusting ring, so that the sum of the first working clearance and the second working clearance conforms to the preset value, and the locking member is configured to lock a position of the first threads relative to the second threads.

8. A compressor, comprising the magnetic levitation bearing assembly according to claim 1.

* * * * *